Jan. 29, 1952 R. LAPSLEY 2,584,032
TRANSMISSION
Filed July 22, 1948 3 Sheets-Sheet 1

FIG. I

INVENTOR.
ROBERT LAPSLEY
BY *Walter E. Schirmer*
ATTY.

Jan. 29, 1952     R. LAPSLEY     2,584,032
TRANSMISSION
Filed July 22, 1948     3 Sheets-Sheet 3
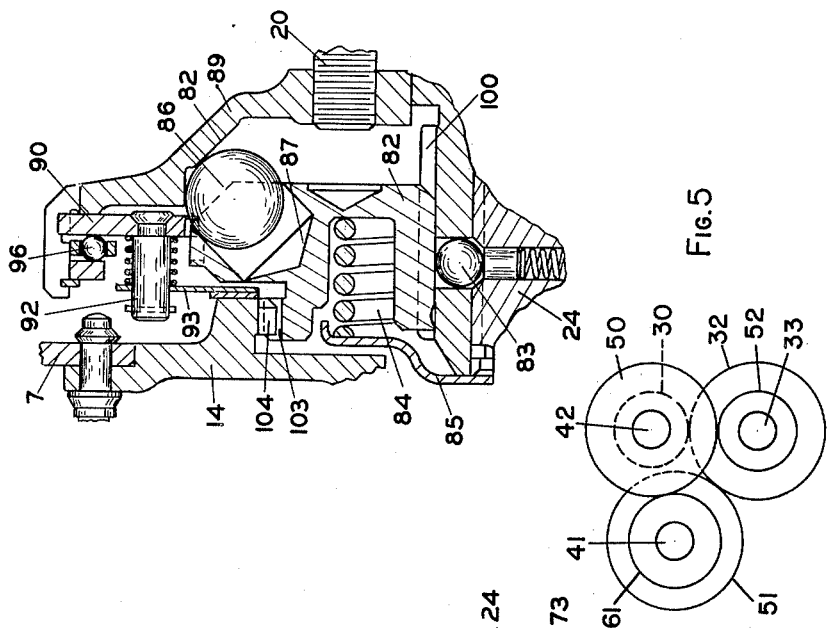
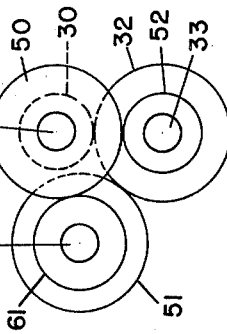
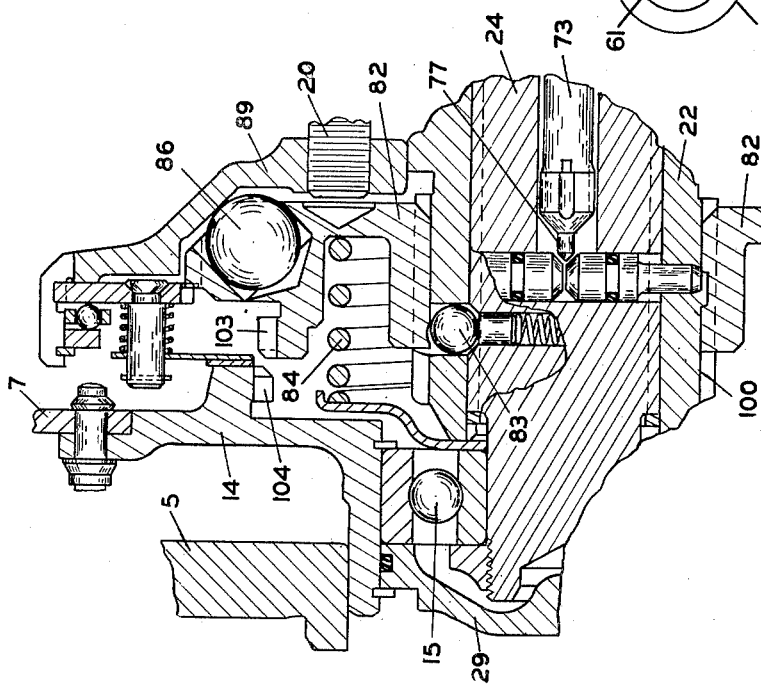
INVENTOR.
ROBERT LAPSLEY
BY Walter E. Silisme
ATTY.

Patented Jan. 29, 1952

2,584,032

UNITED STATES PATENT OFFICE 2,584,032

TRANSMISSION

Robert Lapsley, Berrien Springs, Mich., assignor to Clark Equipment Company, Buchanan, Mich., a corporation of Michigan Application July 22, 1948, Serial No. 40,137

12 Claims. (Cl. 74—732)

This invention relates to transmissions and more particularly is concerned with a transmission of the type embodying a fluid torque converter for receiving the primary drive from the engine and which, in turn, drives gearing disposed in a gear box rearwardly of the torque converter by which various speed ratios may be transmitted to an output shaft. It is especially adapted for transmissions for use in buses, trucks, industrial material handling vehicles, and the like.

One of the primary objects of the present invention is to provide a construction in which the torque converter can be directly coupled to the engine flywheel for obtaining the efficiency of a direct drive through the higher speed operations of the vehicle. However, it is necessary to provide means for preventing this direct lock up of the converter during the lower speed ranges and in reverse gear, in order to obtain the advantages of an infinitely variable torque capacity during starting or reversing of the the vehicle and up until such time as the vehicle is moving at a predetermined speed.

The present invention contemplates a transmission having a low and high gear ratio provided by two sets of constantly meshed gearing disposed behind and driven from the turbine member of the torque converter, these two speed ratios being selectively controlled through a synchronizing mechanism for selectively driving the output shaft, either through a reduction drive or directly coupled to the shaft driven by the turbine of the converter.

Interlocking means is provided which is associated with the synchronizing clutch mechanism, whereby when this clutch mechanism is shifted into position to effect the high range speed ratio, the clutching means for coupling the turbine directly to the flywheel of the engine is released for actuation. However, actual actuation of this coupling means is controlled by a speed responsive means which is responsive to the speed of rotation of the turbine shaft and which, when actuated, provides a means for directly coupling the turbine of the torque converter to the flywheel of the engine, and consequently, directly to the pump member of the converter, thereby providing a drive which is independent of the torque varying characteristics of the converter.

Suitable balking mechanism is associated with the actuating means to insure that the coupling action will not occur until such time as the speed of rotation of the turbine member and of the flywheel are substantially synchronous.

Thus, another feature of the present invention is to provide automatic means responsive to the speed of the vehicle for producing a direct coupling action to the flywheel of the engine, which automatic means, however, is interlocked with the shifting mechanism to prevent its actuation except when the change speed gearing behind the converter is shifted to the high speed ratio and which remains inoperative whenever the vehicle is in low speed drive or reverse drive.

Other objects and advantages of the present invention will appear more fully from the following detailed description, which, when taken in conjunction with the accompanying drawings, will disclose to those skilled in the art, the particular construction and operation of a preferred form of the present invention.

In the drawings:

Figure 3 is a partial sectional view, similar to Figure 2, with the coupling means starting to move toward coupling position.

Figure 4 is a corresponding detail sectional view of the coupling means when in direct coupled position; and Figure 5 is a diagrammatic sectional view showing the reverse gear mechanism for the transmission.

Figure 1:
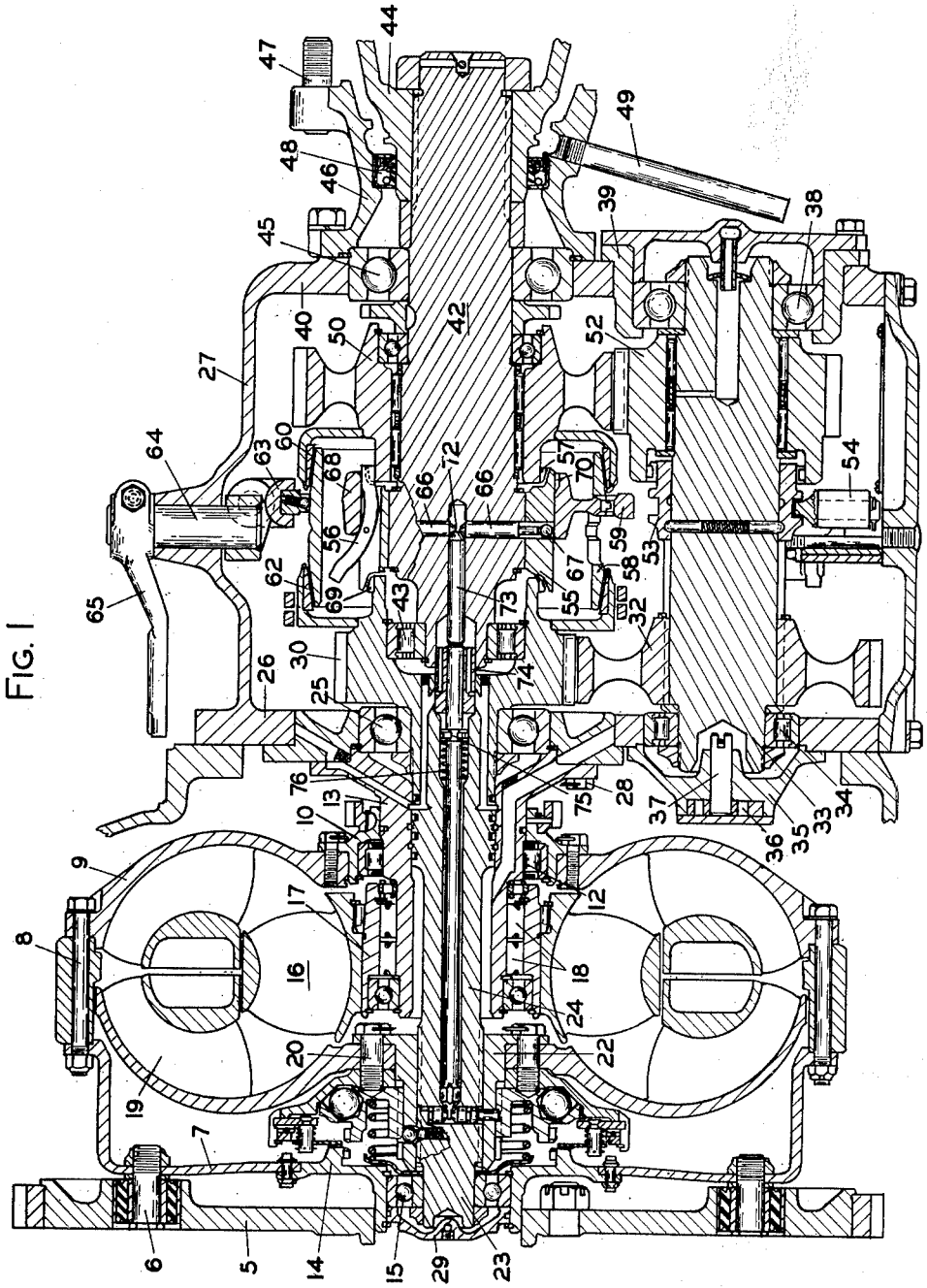
Figure 1 is a sectional view through a transmission embodying the present invention.

Referring now in detail to the drawings, the engine flywheel is indicated generally at 5, which flywheel 5 is provided with circumferentially spaced studs 6, seated in rubber bushings and carrying a plate member 7, which has its outer peripheral portion clamped by means of the studs 8 to the pump member 9 of the torque converter. The pump member 9, in turn, is mounted upon a hub member 10, seated upon bearings 12, for rotatably journaling the same upon the fixed sleeve member 13. The plate member 7, at its inner periphery, is provided with a hub portion 14, journaled upon the ball bearing assembly 15, thus providing rotatable support for the housing of the converter, consisting of the plate member 7 and the pump element 9.

Within the converter, there is provided the reaction or stator member 16, which has its hub portion keyed to a sleeve member 17, mounted for rotation in a forward direction only, upon one-way clutch members 18, also journalled about a reduced portion of the sleeve member 13. Suitable bearing means is also provided for supporting the hub portion of the stator member for rotation.

The turbine or driven member 19 of the converter is enclosed within the plate member 7, and has its hub portion mounted by means of studs 20, upon a sleeve member 22, which is splined upon the forward end 23 of a shaft member 24, extending within the sleeve 13 and journalled at its opposite end by means of the bearings 25 in the forward end wall 26 of a transmission housing 27. It will be noted that the sleeve member 13 is provided with a flanged portion at the rear end thereof, which is secured as by means of bolts 28, to the wall 26 of the transmission housing.

Thus, it will be seen that the shaft 24 is rotatably journalled at its forward end by means of the bearings 15, axially of the engine flywheel, this assembly being closed by the cap member 29, while at its rear end, it is journalled in the bearings 25 and thereby supported against deflection but is freely rotatable relative to the flywheel and to the housing and sleeve. The shaft projects into the transmission housing and is provided with an upset end therein upon which is formed a gear portion 30, which has constant meshing engagement with a gear 32, fixed upon the counter shaft 33 in the transmission housing. This counter shaft is supported at its forward end by means of bearings 34 in the wall 26 of the housing, and is closed by an end cap member 35, carrying a small oil pump 36 therein, driven by the shaft 37 through a pin connection with the recessed end of the countershaft. At its opposite end, the counter shaft is supported in the ball bearings 38, carried in a bushing 39, secured in the rear end wall 40 of the transmission.

Journalled in the recessed end of the gear portion 30 of the shaft 24, is the transmission output shaft 42, this shaft having a reduced end portion seated within the bearing assembly 43. The opposite end of the shaft 42 projects through the rear end wall 40 of the transmission housing, and has mounted thereon the companion flange 44 of a universal joint assembly by which it is connected to the propeller shaft. It is supported in this end wall by means of the bearing assembly 45, which is closed by a tubular sleeve member 46, provided with suitable means, such as indicated at 47, for supporting a brake assembly thereon. An oil seal 48, is interposed between the sleeve 46 and the companion flange hub, and any oil leaking therepast is drained out by means of the drain tube 49.

The shaft 42 has rotatably journalled thereon a gear member 50, which is in constant meshing engagement with a gear 52, rotatably journalled on the counter-shaft 33. A suitable clutch member 53 is splined for axial sliding movement on the counter-shaft 33, and when in the position shown in Figure 1, clutches the gear 52 to the shaft 33 to provide a drive from gear 30 through gear 32 and shaft 33 back to gear 50. The clutch member 53 is adapted to be actuated by an actuating fork 54, mounted in the bottom portion of the transmission housing, and when shifted in the opposite direction out of engagement with the gear 52, is adapted to couple a reverse idler gear 51 mounted on lay shaft 41 laterally offset from shafts 33 and 42 as shown diagrammatically in Figure 5. Idler gear 51 is driven by gear 32 and drives shaft 41. A second idler gear 61 is in meshing engagement with gear 50 on shaft 42 and suitable clutch means is operable to couple this gear to shaft 41 only when clutch 53 is shifted out of meshing engagement with gear 52 on shaft 33. This provides reverse drive to the gear 50. Power from the gear 50 is transmitted to the shaft 42 through a synchronizing clutch member, shown in detail in Figure 1, and comprising a hub portion 55 splined on the shaft 42, and carrying rocker members 56, which may be of the type described in detail in the United States Letters Patent #2,412,208 of Donald S. Dence, issued December 10, 1946 and which, as shown in Figure 1, are in clutching engagement with the clutch teeth 57, carried by the gear 50, thereby clutching the gear 50 directly to the shaft 42. A suitable synchronizing sleeve 58 encloses the rocker clutch mechanism and is provided with a suitable actuating collar 59, operating through slots in the synchronizer member, for shifting the sleeve into engagement selectively with the synchronizer cones 60 and 62, carried by the gears 50 and 30, respectively. This collar 59, is adapted to be shifted by means of a suitable yoke member 63, actuated through the shifter shaft 64, controlled by shift lever 65, and in the position shown in Figure 1, is in the position for effecting a low speed drive through the transmission. It remains in this position for reverse drive also, in which case the clutch member 53, on the counter-shaft is shifted to the left to provide the reverse gear drive. This particular drive is not a part of the present invention, and therefore has not been shown for the sake of clarity.

The shaft 42 is provided with a pair of oppositely extending radial openings within which are disposed radially movable poppet members 66, having at their ends suitable ball members 67, as shown in the sectional portion at the lower end of the shaft, which ball members are normally maintained below the peripheral surface of the hub 55, by the enclosing annular ring portion 68 of the shiftable sleeve 59. When the sleeve is shifted to the left from the position shown in Figure 1, it first produces movement of the synchronizer sleeve 58 into frictional engagement with the cone 62, thereby bringing shaft 42 and gear 30 into synchronous speed.

Further shifting rocks the rocker members 56 in a counter clockwise direction into engagement with the clutch teeth 69, carried by the gear 30, thereby locking the gear 30 directly to the shaft 42. It will be noted that the encircling sleeve 68 has, at its right hand end recesses 70, which, when the sleeve is shifted to the left, move into a position over the poppet members 66, thereby allowing these poppet members to move radially outwardly. It will be noted that the inner ends of the poppet members are of substantially conical form, and when retained in inwardly pressed position, form a blocking action, preventing the end 72 of the pin 73 from moving to the right. The pin 73 extends axially through the shaft 42 and also through the shaft 24. Intermediate the two shafts, there is a bushing 74, provided for retaining the pin 73 in position between the shafts and for transmitting oil between the two shafts when they are moving at different rates of speed.

Figure 2:
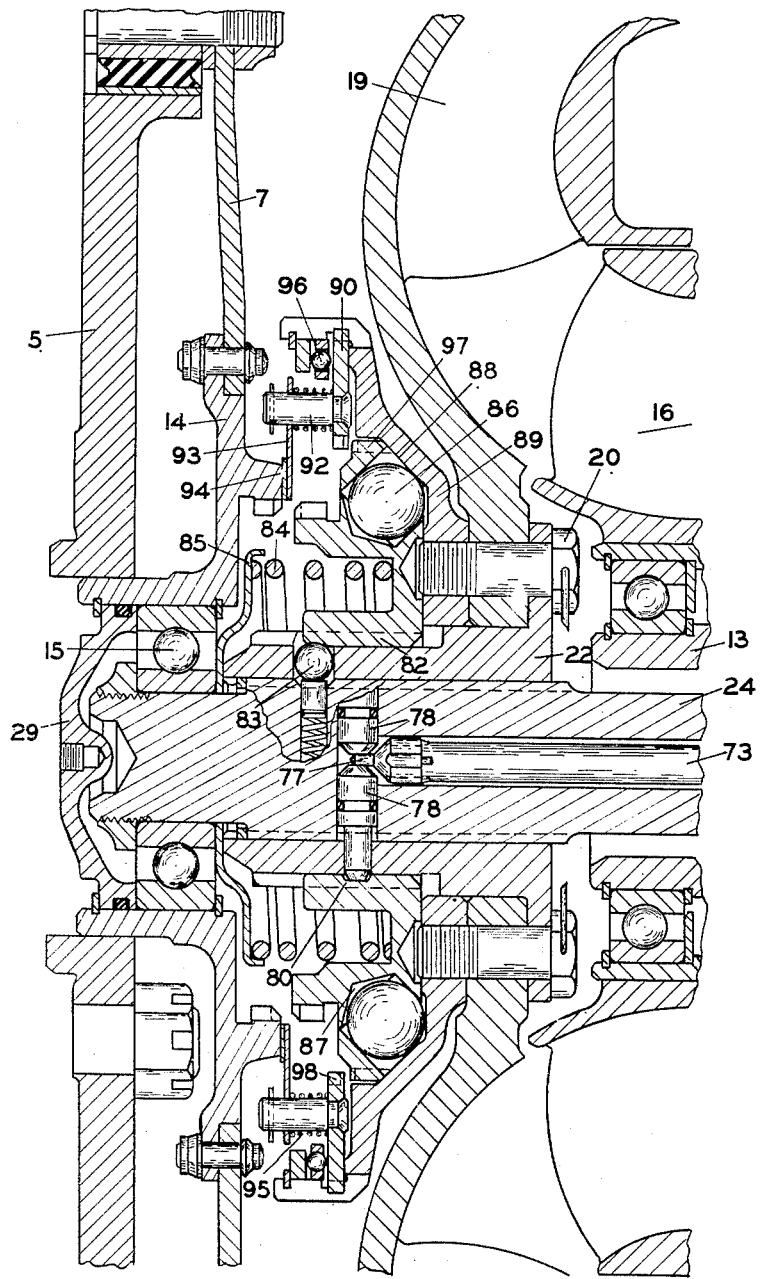
Figure 2 is an enlarged detail sectional view of the forward end of the converter showing the direct coupling means in uncoupled position.

The pin 73 is provided with an enlarged collar portion 75, within the recessed end of the shaft 24, which collar portion is normally biased to the right by means of a coil spring seated within this recess. However, the pin 73 is prevented from moving to the right, except when the collar 68 has been shifted to the left to couple gear 30 directly to shaft 42. When this occurs, the poppets 66 move out of the way; the spring 76 forces the pin 73 to the right, thereby withdrawing the reduced end 77 of the pin, shown in more detail in Figures 2 and 3, from between the poppets 78, extending radially through the shaft 24 and through the hub member 22 of the turbine element 19. It will be noted that the outer ends of the poppets, as shown in detail in Figure 2, when the reduced end 77 of the pin 73 is inserted therebetween, are forced outwardly beyond the peripheral surface of the hub member 22 and into recesses 80, formed in the inner surface of the hub portion of a speed responsive sleeve member 82, splined on the hub 22 and radially encircling the poppets.

Withdrawal of the portion 77 of pin 73 allows the poppets 78 to be moved inwardly, thereby releasing the member 82 for axial movement to the left. This movement, however, is opposed by the ball detent member 83, which is spring pressed outwardly through an opening in the hub 22 and engages a relieved portion on the inner periphery of the member 82, and also by a coil spring 84, biased at one end against a plate member 85, carried by the shaft 24, and locked into position against the bearing 15, and at the opposite end biased in a recessed pocket formed in the member 82.

The member 82 carries a plurality of circumferentially spaced balls 86, disposed in angularly directed pockets 87, which balls are responsive to the speed of rotation of the shaft 24, and tend to move outwardly under centrifugal force against a cam surface 88 formed in a plate member 89, secured to the turbine member 19 by the studs 20, which also secure the hub member thereto. The plate member 89, extends beyond the peripheral limits of the member 82, and at its outer end, is adapted to carry an annular disc 90, which disc is mounted for limited rotation with respect thereto, but is held against axial sliding movement. The disc 90 carries a plurality of pins 92, which, adjacent their ends, carry a friction plate 93, adapted to bear against a corresponding friction plate 94, secured to the hub portion 14 of the plate member 7, thereby producing a drag upon the disc 90. Suitable small coiled springs 95 force the friction plate 93 into frictional engagement with the surface 94. The outer flange portion of the plate 89 carries a plurality of circumferentially spaced anti-friction balls 96 which bear against one side of the annular disc 90.

The member 82, beyond the series of ball pockets 87, is provided with tooth portions 97, which tooth portions are adapted to move into meshing engagement with corresponding teeth 98 on the inner periphery of the disc 90 whenever the centrifugal force produced by the balls 86, cam the member 82 axially to the left away from the plate member 89, and the members 19 and 5 tend to assume synchronous speed. This provides a balking action which prevents axial shifting of the member 82 until such time as direct reversal takes place, at which time the centrifugal action of the balls 86, moves the member 82 axially to the left against the pressure of spring 84 and poppets 83, locking this member to the disc 90 through the action of teeth 97 and 98. This position, as the teeth 97 and 98 move into meshing engagement, is clearly shown in Figure 3, from whence it will be seen that the ball detent 83 has been depressed, and the hub portion of the member 82 has started to shift axially to the left along the splines 100 of the hub member 22.

The centrifugal force at this time and under conditions such as to bring about this meshing engagement, is such that when the balking action has been removed, the balls continue to move outwardly of the ball pockets 87, thereby moving the member 82 to the left and since the balking action has alined the member 82 circumferentially with respect to the member 14, the clutch teeth 103, carried by the member 82, are in position to be alined with the tooth spaces between the teeth 104, carried by the hub 14, thereby allowing these teeth to move into meshing engagement as shown in Figure 4. When this position has been reached, it provides a direct lockup from the member 14, and consequently from the flywheel 5 through the member 82, and the splines 100 to the sleeve or hub 22, and thence through the splines of this hub directly to the shaft 24, thereby locking the turbine member 19 for conjoint rotation, which, in effect, produces a direct drive from the flywheel 5 to the shaft 24.

This direct drive, however, can be effected only when the synchronizer clutch in the transmission housing 27 has been shifted to the left to lock the gear 30 to the gear 42, which produces direct drive between shaft 24 and shaft 42, and consequently cannot be effected when the encircling sleeve 68 has been moved into position to allow the ball portions 67 of poppets 66 to enter into the recesses 70 of the sleeve. Consequently, no direct lockup can take place as long as the gear portion of the transmission is either in low speed or reverse drive, but only after direct drive has been effected and then only when a predetermined speed has been reached, at which time balls 86 will operate to cam the member 82 to the left into clutching position with the hub 14 of the plate member. This direct drive will remain in operation until the speed of the vehicle is reduced to a point where the spring pressure of spring 84 disengages the coupling action and restores the torque converter action, or until the operator shifts the transmission back to low speed position, which automatically forces poppets 66 inwardly, thereby forcing pin 73 to the left and locking the member 82 back into its original position. This, of course, cannot occur until such time as the speed of the vehicle has dropped to a point where the centrifugal action of the balls is insufficient to hold the coupling member 82 in coupling position and the spring 84 has restored the member 82 to the position shown in Figure 1.

It is therefore believed apparent that I have provided a novel type of torque coupling mechanism interlocked with the gear shift mechanism in the transmission, to prevent any direct coupling action except in high speed and to provide restoration of the torque converter drive prior to shifting of the transmission back to either low speed or reverse position.

I am aware that various changes may be made in certain details of the invention without in any way departing from the underlying principles thereof, and I do not intend to be limited except as defined by the scope and spirit of the appended claims.

I claim:

1. In a transmission embodying a torque converter having pump, stator and turbine elements, a transmission driven from said turbine and having low and high speed ranges, means for locking said pump and turbine together for conjoint rotation, means in said transmission normally preventing operation of said locking means unless said transmission is in high speed range, and centrifugally operable means responsive to the speed of rotation of said turbine for energizing said locking means.

2. The transmission of claim 1 including balking means preventing engagement of said locking means until said pump and turbine assume substantially synchronous speed.

3. In a transmission, a torque converter having a pump, a stator and a turbine, a shaft driven by said turbine, an output shaft associated therewith, clutch means for coupling said shafts together for direct drive, an axially movable locking element splined on said turbine, a corresponding locking element on said pump means engaged by said clutch means for locking said element against axial movement except when said clutch means is in shaft coupling position, and speed responsive means carried by said element for causing the same to move into locking engagement with said locking element on said pump.

4. The transmission of claim 3 including friction controlled means balking locking movement of said locking element under the influence of said speed-responsive means until said pump and turbine assume substantially synchronous speed.

5. In a torque converter adapted to be driven from a flywheel and including a pump and housing connected to said flywheel, a stator and a turbine, a shaft driven by said turbine, an axially shiftable locking element splined on said turbine for locking said turbine to said housing, means extending through said shaft for locking said element against movement, a second shaft, means on said second shaft for releasing said locking means, speed-responsive means carried by said element for actuating it toward locking position upon release of said locking means, and means for preventing movement of said element into locking position until said housing and turbine assume substantially synchronous speed.

6. In a torque converter adapted to be driven from a flywheel and including a pump and housing connected to said flywheel, a stator and a turbine, a shaft driven by said turbine, an axially shiftable locking element splined on said turbine for locking said turbine to said housing, means extending through said shaft for locking said element against movement, a second shaft, means on said second shaft for releasing said locking means, speed-responsive means carried by said element for actuating it toward locking position upon release of said locking means, means for preventing movement of said element into locking position until said housing and turbine assume substantially synchronous speed, and means for returning said locking element to inoperative position when said turbine drops below a predetermined rotating speed.

7. A drive unit including a torque converter having pump, stator and turbine elements, an output shaft driven by said turbine, a coaxial power shaft, means for coupling said shafts for conjoint rotation, locking means for locking said turbine and pump elements for conjoint rotation in response to predetermined speed of rotation of said turbine element, and means rendering said locking means inoperative when said coupling means is out of coupling position.

8. In a transmission embodying a torque converter having pump, stator and turbine elements, a transmission driven from said turbine element and having low and high speed ranges, means for locking said pump and turbine elements together for conjoint rotation, means in said transmission normally preventing operation of said locking means except when said transmission is in high speed range, and speed responsive means for actuating said locking means.

9. The transmission of claim 8 including means restraining engagement of said locking means until said pump and turbine elements assume substantially synchronous speed.

10. In a transmission embodying a torque converter having a pump, stator and turbine, a transmission driven from said turbine including a main shaft, means for connecting said turbine and main shaft together for direct drive means operable to lock said pump and turbine together for conjoint rotation, means in said transmission conditioning said locking means for operation only when said turbine and main shaft are connected for direct drive therebetween, and speed-responsive means for energizing said locking means.

11. In a transmission embodying a torque converter having a pump, stator and turbine, a transmission driven by said turbine including low and high speed ranges, means operable to lock said pump and turbine together for conjoint rotation, means for preventing operation of said locking means until said transmission is in high speed range, and speed responsive means operable above a predetermined minimum speed of rotation of a turbine-driven element for energizing said locking means toward locking position.

12. The transmission of claim 11 including means restraining movement of said locking means into locking position until said pump and turbine assume substantially synchronous speed.

ROBERT LAPSLEY.

REFERENCES CITED

The following references are of record in the file of this patent:

UNITED STATES PATENTS

| Number | Name | Date |
| --- | --- | --- |
| 2,168,350 | Lapsley | Aug. 8, 1939 |
| 2,177,212 | Evrell | Oct. 24, 1939 |
| 2,267,334 | Keller | Dec. 23, 1941 |
| 2,354,596 | Jandasek | July 25, 1944 |
| 2,371,574 | Swennes | Mar. 13, 1945 |
| 2,374,303 | Osborne | Apr. 24, 1945 |
| 2,449,608 | LeMay | Sept. 21, 1948 |
| 2,466,721 | Maurer | Apr. 12, 1949 |
| 2,480,933 | Jandasek | Sept. 6, 1949 |

FOREIGN PATENTS

| Number | Country | Date |
| --- | --- | --- |
| 151,563 | Austria | Nov. 25, 1937 |
| 224,328 | Switzerland | Feb. 1, 1943 |
| 450,034 | Great Britain | July 9, 1936 |